United States Patent Office 3,489,585
Patented Jan. 13, 1970

3,489,585
STABLE PHOSPHORUS CONTAINING SOLUTIONS
George T. Miller, Lewiston, N.Y., assignor to Hooker Chemical Corporation, Niagara Falls, N.Y., a corporation of New York
No Drawing. Filed Nov. 4, 1968, Ser. No. 773,272
Int. Cl. C23f *17/00;* C23b *5/62;* B44d *5/12*
U.S. Cl. 106—287                                           4 Claims

---

ABSTRACT OF THE DISCLOSURE

A stable solution of phosphorus and trichloroethylene, which solution contains a stabilizing amount of a stabilizer composition, the stabilizer composition being a polyhydroxy compound selected from butanetriol, resorcinol and hydroquinone. The resulting stabilized trichloroethylene solution is substantially free of any phosphrous scum or precipitate, even after heating for prolonged periods, and is suitable for use as a preplating treating composition in processes for the metal plating of plastic and related processes.

---

The present invention relates to a stable organic solvent solution of phosphorus and more particularly it relates to a method of stabilizing a solution of white phosphorus in trichloroethylene so as to minimize the formation of phosphorus scum or precipitation in the solution, even after prolonged periods of heating.

Recently, there has developed considerably interest in the production of metal plated plastic articles. The use of such articles has become increasingly prevalent in various industries, including the automotive industry, appliance industry, and the like. As a result, numerous processes have been devised for the production of such metal plated plastic articles.

One such process, which represents an improvement over the heretofore known processes, in terms of simplified operation and the variety of plastic substrates which may be plated, involves the pretreatment of the plastic surface with phosphorus in an organic solvent. Phosphorus is deposited at the plastic surface, which surface is then contacted with a metal salt or complex to form a metal-phosphorus compound, the resulting treated surface being either conductive or capable of catalyzing the reduction of a metal salt to produce a conductive surface. These conductive surfaces may then be readily electroplated by conventional means.

In the practice of the above process, particularly with respect to the use of the organic solvent solution of phosphorus, it has been found that a scum or precipitate of phosphorus is formed in the organic solvent solution. This formation of phosphorus precipitate is accelerated at the elevated temperatures at which the organic solvent solution of phosphorus is normally used. The formation of this phosphorus scum or precipitate is objectionable, not only from the standpoint of its deposition on the plastic surfaces being treated, but also from the fact that its formation removes phosphorus values from the solution, thus adding to the overall cost of the process.

It is, therefore, an object of the present invention to provide a stable, organic solvent solution of phosphorus.

A further object of the present invention is to provide a stable solvent solution of phosphorus, which solution is suitable for use in pretreatment of plastic surfaces in a process for the metal plating of plastics.

These and other objects will become apparent to those skilled in the art from the description of the invention which follows.

Pursuant to the above objects, the present invention includes a stable organic solvent-phosphorus composition which comprises trichloroethylene, white phosphorus, and a stabilizing amount of a stabilizer comprising a polyhydroxy compound selected from butanetriol, resorcinol and hydroquinone. This composition is found to be suitable as a preplate treatment in processes for the metal plating of plastic and is stable to the formation of a phosphorus sludge or precipitate even after heating for extended periods of time.

More specifically, in the practice of the present invention, the subject stable, organic solvent-phosphorus composition contains trichloroethylene in an amount sufficient to form such composition containing the desired amount of phosphorus. The trichloroethylene is desirably present in the composition in an amount within the range of about 50 to 99.9+% by weight of the composition and is preferably present in an amount within the range of about 80 to 99%.

The phosphorus is present in the subject composition in an amount which is at least sufficient to provide for the desired deposition of phosphorus on the plastic surface which is treated therewith. Desirably, the composition contains the phosphorus in an amount within the range of about 0.0001% by weight of the solution up to an amount sufficient to provide a saturated solution of phosphorus, with amounts within the range of about 0.01 to 2.5% by weight of the solution being preferred. It is to be appreciated, that the phosphorus utilized in the present composition is the so-called white or yellow phosphorus.

In addition to the trichloroethylene and white phosphorus, the compositions of the present invention also contain a stabilizing amount of a stabilizer which is effective in minimizing the formation of phosphorus scum or precipitate in the solution. This stabilizer composition comprises polyhydroxy compounds selected from butanetriol, resorcinol and hydroquinone. Typically, an effective stabilizing amount of the stabilizer in the composition is an amount which is at least about 0.0001% by weght of the composition, with amounts of the stabilizer within the range of about 0.01 to 20% by weight of the composition being preferred.

As has been indicated, the stabilizer is a polyhydroxy organic compound selected from butanetriol, resorcinol and hydroquinone, with the preferred stabilizer being butanetriol. Of the various butanetriols which may be used, including 1,2,3-butanetriol; 1,2,4-butanetriol; 1,3,4-isobutanetriol; 2,3,4-isobutanetriol and the like, 1,2,4-butanetriol is preferred and primary reference hereinafter will be made thereto. This is not, however, to be taken as a limitation on the stabilizer which may be used as similar results are also obtained with the other polyhydroxy organic compounds indicated.

The stabilized trichloroethylene-phosphorus compositions of the present invention may be formulated by admixing the above-described components in amounts within the ranges which have been indicated. Although this admixing may be carried out in any suitable manner, preferably, the stabilizer component is first admixed with the trichloroethylene and, thereafter, the phosphorus is added to the trichloroethylene containing the stabilizer.

The thus-formulated solvent solution may be utilized as such or, if desired, it may be formed into a water emulsion by emulsifying it with water and a suitable emulsifying agent, water in amounts of from about 40 to 70 parts by weight per hundred parts of emulsion, being typical. Suitable emulsifying agents which may be used include anionic, cationic and non-ionic surface active agents such as the mono- and di-alkyl oxypoly(ethyleneoxy)ethanols; fatty acid esters of polyhydric alcohols or ether alcohols;

alkali metal alkyl benzene sulfonates; alkali metal alkyl sulfates; sulfonated aliphatic polyesters; free acid and sodium salts of complex phosphate esters; alkali metal lignin sulfonates; fatty amides of monoethanolamines; fatty nitriles; fatty acid amides; polyoxyethylated alkyl amines; and the like.

The stabilized, phosphorus-containing trichloroethylene compositions, either as a solution or an emulsion, as described above, may then be used as a pretreatment for plastic surfaces in a process for the metal plating of plastic. In such a process, the surface of the plastic article to be treated is contacted with the phosphorus-containing trichloroethylene composition for a period sufficient to effect deposition of the desired amount of phosphorus at the surface of the plastic article. The contact time will, of course, vary depending upon the nature of the plastic, the makeup of the coating composition and the temperature at which it is used. Typically, contact times may be within the range of about 1 second to an hour or more, with times within the range of about 1 to 20 minutes being preferred. The treatment with the phosphorus-containing trichloroethylene composition is carried out at a temperature which is below the softening point of the plastic being treated and also below the boiling point of the solvent. Desirably, the temperatures used are within the range of about 30 to 135 degrees centigrade, with temperatures within the range of about 50 to 100 degrees centigrade being preferred. It is found, that when operating in this manner, little or no phosphorus sludge is formed in the treating compositions, even after they have been used for an extended period of time.

Following the treatment of the plastic surfaces with the phosphorus-containing trichloroethylene solution, the surfaces may be contacted with a solution of a metal salt or a complex of a metal salt which is capable of reacting with the phosphorus to form a metal phosphide. Typical of the metal salt solutions which may be used are solutions of copper sulfate, copper chloride, silver nitrate, nickel cyanide, nickel sulfate, and the like. Thereafter, the treated plastic surfaces may be subjected to an electroless or chemical plating process wherein the surface is contacted with a solution of a metal salt so that the metallic ion of the metal salt is reduced to the metallic state and deposited on the treated plastic surface. Typical of such processes are those for the deposition of a nickel coating, which processes may use a solution of a nickel salt in an aqueous hypophosphite or borohydride solution. The thus-treated plastic surface may then be electroplated, using conventional electroplating processes, to produce a metal plated plastic article. The above-described process for the treatment of the plastic surfaces is set forth in detail in co-pending applications Ser. No. 614,541 filed Feb. 8, 1967, and Ser. No. 683,793 filed Nov. 17, 1967.

In order that those skilled in the art may better understand the present invention and the manner in which it may be practiced, the following specific examples are given. In these examples, unless otherwise indicated, parts and percents are by weight and temperatures are in degrees centigrade. It is to be appreciated, however, that these examples are merely exemplary of the present invention and are not to be taken as a limitation thereof.

In the following examples, a solution was made of trichloroethylene containing 2% by weight of white phosphorus. Various stabilizing components were added to this solution and the resulting solutions were heated at 60 degrees centigrade. Following the heating, the solutions were observed to determine the amount of phosphorus precipitate or scum formed in the solution. Using this procedure, the following results were obtained:

| Example | Stabilizer, amount (percent) | Heating time (hours) | Results |
| --- | --- | --- | --- |
| 1 | None | 16 | Yellow P ppt. |
| 2 | Hydroquinone, 0.02% | 312 | Slight haze, no P ppt. |
| 3 | Resorcinol, 0.02% | 312 | Clear, No P ppt. |
| 4 | 1,2,4-butanetriol, 5.0% | 432 | Do. |

The stable compositions of the preceding Examples 2 through 4 are used to treat various plastic surfaces including polyvinyl chloride, polyethylene, and polypropylene, which surfaces may then be further treated and finally electroplated with nickel, using the procedures set forth in the aforementioned U.S. Ser. No. 614,541 and Ser. No. 683,793.

It is to be appreciated, that although primary reference has been made to hydroquinone, resorcinol and butanetriol as the stabilizer materials, other similar polyhydroxy compounds which have equivalent stabilizing effectiveness may also be used, provided such materials do not have an adverse effect on the phosphorus solution or the process in which it is used.

While there have been described various embodiments of the invention, the compositions and methods are not intended to be understood as limiting the scope of the invention, as it is realized that changes therewithin are possible and it is intended that each element recited in the following claims is to be understood as referring to all equivalent elements for accomplishing substantially the same results in substantially the same or equivalent manner, it being intended to cover the invention broadly in whatever form its principle may be utilized.

What is claimed is:

1. A stable, organic solvent-phosphorus composition which comprises trichloroethylene, white phosphorus, and a stabilizing amount of a stabilizer, which stabilizer comprises a polyhydroxy compound selected from butanetriol, resorcinol and hydroquinone wherein the trichloroethylene is present in an amount within the range of about 50–99.9% by weight of the composition, the white phosphorus is present in an amount of at least about 0.0001% by weight of the composition, and the stabilizer is present in an amount of about 0.0001 to 20% by weight of the composition.

2. The composition as claimed in claim 1 wherein the stabilizer is 1,2,4-butanetriol.

3. The composition as claimed in claim 1 wherein the stabilizer is hydroquinone.

4. The composition as claimed in claim 1 wherein the stabilizer is resorcinol.

References Cited

UNITED STATES PATENTS 2,486,664   1/1949   Marling et al. _____ 106—14

JULIUS FROME, Primary Examiner

T. MORRIS, Assistant Examiner

U.S. Cl. X.R.

106—1; 117—47, 127; 148—6.15; 204—30